(12) United States Patent
Yang et al.

(10) Patent No.: US 9,030,565 B2
(45) Date of Patent: May 12, 2015

(54) METHOD, APPARATUS, AND SYSTEM FOR EVALUATING VIDEO QUALITY

(75) Inventors: Peilin Yang, Nanjing (CN); Wenxiao Yu, Nanjing (CN); Xiangsheng Xu, Nanjing (CN); Youqing Yang, Nanjing (CN); Yinliang Hu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 13/457,198

(22) Filed: Apr. 26, 2012

(65) Prior Publication Data

US 2012/0212624 A1 Aug. 23, 2012

Related U.S. Application Data

(63) Continuation of application No. PCT/CN2010/077985, filed on Oct. 22, 2010.

(30) Foreign Application Priority Data

Nov. 3, 2009 (CN) .......................... 2009 1 0207416

(51) Int. Cl.
*H04N 17/00* (2006.01)
*H04N 21/442* (2011.01)
*H04N 19/172* (2014.01)
*H04N 19/154* (2014.01)
*H04N 19/174* (2014.01)

(Continued)

(52) U.S. Cl.
CPC ....... *H04N 17/004* (2013.01); *H04N 21/44209* (2013.01); *H04N 19/172* (2014.11); *H04N 19/154* (2014.11); *H04N 19/174* (2014.11); *H04N 19/89* (2014.11); *H04N 19/188* (2014.11)

(58) Field of Classification Search
CPC .......... H04N 19/002; H04N 19/00933; H04N 19/00266; H04N 19/00939
See application file for complete search history.

(56) References Cited

U.S. PATENT DOCUMENTS

| 2007/0009041 | A1* | 1/2007 | Wang ....................... 375/240.19 |
| 2007/0283400 | A1 | 12/2007 | Lee et al. |
| 2010/0238792 | A1* | 9/2010 | Togo ............................. 370/216 |

FOREIGN PATENT DOCUMENTS

| CN | 101227604 A | 7/2008 |
| CN | 101448176 A | 6/2009 |

(Continued)

OTHER PUBLICATIONS

Extended European Search Report issued in corresponding European Patent Application No. 10827868.0, mailed Sep. 21, 2012.

(Continued)

*Primary Examiner* — Jefferey Harold
*Assistant Examiner* — Samira Monshi
(74) *Attorney, Agent, or Firm* — Brinks Gilson & Lione

(57) ABSTRACT

Embodiments of the present invention provide a method, an apparatus, and a system for evaluating video quality. In the embodiments of the present invention, a method in the prior art that the video quality is determined only according to the number of lost packets and a packet loss rate is modified, and the location of the most important lost packet is determined by analyzing the influence of the lost packet on other packets, and a damage degree or degree of intactness of the video frame is determined according to the most important lost packets, so as to determine the quality of the video frame. The method greatly improves the precision for evaluating the video quality.

11 Claims, 5 Drawing Sheets

(51) Int. Cl.
*H04N 19/89* (2014.01)
*H04N 19/169* (2014.01)

(56) References Cited

FOREIGN PATENT DOCUMENTS

| EP | 1069783 A2 | 1/2001 |
|---|---|---|
| KR | 20090089553 A | 8/2009 |
| WO | WO 02/35847 A2 | 5/2002 |

OTHER PUBLICATIONS

Kanumuri et al., "Predicting H.264 Packet Loss Visibility using a Generalized Linear Model" ICIP IEEE 2006.

Liang et al., "Analysis of Packet Loss for Compressed Video: Effect of Burst Losses and Correlation Between Error Frames" IEEE Transactions on Circuits and Systems for Video Technology, vol. 18, No. 7, Jul. 2008.

Tao et al., "Real-Time Monitoring of Video Quality in IP Networks" IEEE/ACM Transactions on Networking, vol. 16, No. 5, Oct. 2008.

Winkler et al., "The Evolution of Video Quality Measurement: From PSNR to Hybrid Metrics" IEEE Transactions on Broadcasting, vol. 54, No. 3, Sep. 2008.

International Search Report and Written Opinion of the International Searching Authority issued in corresponding PCT Patent Application No. PCT/CN/2010/077985, mailed Feb. 10, 2011.

Yamagishi et al., "Packet-layer Model for End-user QoE Management" NTT Technical Review, 2009.

Rapporteurs Q14/12, "Updated Draft Terms of Reference (ToR) for P.NAMS" International Telecommunication Union—Telecommunication Standardization Sector. Study Group 12. TD 146, Study Period 2009-2012. Geneva, Nov. 3-12, 2009.

Welch et al., "A Proposed Media Delivery Index (MDI)" Network Working Group, Apr. 2006. Rfc4445.

* cited by examiner

METHOD, APPARATUS, AND SYSTEM FOR EVALUATING VIDEO QUALITY

CROSS-REFERENCE TO RELATED APPLICATIONS

This application is a continuation of International Application No. PCT/CN2010/077985, filed on Oct. 22, 2010, which claims priority to Chinese Patent Application No. 200910207416.X, filed on Nov. 3, 2009, both of which are hereby incorporated by reference in their entireties.

FIELD OF THE APPLICATION

The present application relates to the technical field of image quality evaluation, and in particular to a method, an apparatus, and a system for evaluating video quality.

BACKGROUND OF THE APPLICATION

With the rapid development of computer technology and communications technologies, remote transmission of video images becomes more and more convenient. An original video forms a video frame including a reference frame (for example, an IDR frame, an I frame, and a P frame) and a non-reference frame (a B frame, which is sometimes a reference frame) after video coding. One video frame generally includes one or more slices (slice), one slice is formed by multiple macroblocks (MB, Macro-Block), each slice may be formed by multiple data packets, or multiple slices may form one packet, for example, Internet Protocol (Internet Protocol, IP) packet or transport stream (Transport Stream, TS) packet. The transmission of a video frame or a video sequence formed by consecutive video frames is achieved through the transmission of the packets. However, in transmission of a data packet, loss of a data packet, that is, a packet loss phenomenon, generally takes place; and sometimes, a packet delay phenomenon also takes place, and delay over video buffer is also interpreted as a packet loss phenomenon (because when a packet that is delayed over video buffer is received, a video receiving node generally does not process the packet, and packet loss processing introduced below also includes packet delay processing), causing that the quality of video images restored by a receiving party from the received packet is influenced or damaged.

Existing video quality monitoring and evaluation solutions may be classified as full-reference video quality evaluation and no-reference video quality evaluation, the full-reference video quality evaluation is mainly evaluation through comparison of an image to be evaluated with an original reference image, and the no-reference video quality evaluation is mainly evaluation according to a bit stream technology. In a no-reference video quality evaluation model, the video quality is evaluated largely through a packet loss rate and the number of lost packets, and a typical solution is, for example, MDI (RFC4445, Media Deliver Index), MOS_V (Mean Opinion Score for Video), and PEVQ (Perceptual Evaluation of Video Quality). The packet loss rate refers to a ratio of the number of lost packets in sent packets in test, and is generally tested within a throughput range.

In the implementation, the inventor finds through research that the method is effective in a case that the number of the packets in a slice is low, for example, in evaluation of standard-definition (standard-definition, SD) video quality; however, when the number of the packets in a slice is increased, the no-reference video quality evaluation is difficult to evaluate the video quality.

SUMMARY OF THE INVENTION

Embodiments provide a method, an apparatus, and a system for evaluating video quality, so as to improve the precision for evaluating the video quality.

In order to solve the above technical problems, technical solutions according to the embodiments are as follows.

A method for evaluating video quality includes:
determining a lost packet in a video frame and a slice to which the lost packet belongs;
determining a location of a most important lost packet in the slice to which the lost packet belongs, where the most important lost packet is the lost packet having the largest influence on the video quality of a current slice; and
determining the quality of the video frame according to the location of the most important lost packet in every slice.

A video quality evaluation apparatus includes:
a first determination unit, configured to determine a lost packet in a video frame and a slice to which the lost packet belongs;
a second determination unit, configured to determine a location of a most important lost packet in the slice to which the lost packet belongs, where the most important lost packet is the lost packet having the largest influence on the video quality of a current slice; and
a third determination unit, configured to determine the quality of the video frame according to the location of the most important lost packet in every slice.

A system for evaluating video quality, includes:
a sending apparatus, configured to generate and send a video packet; and
an evaluation apparatus, configured to determine a lost packet in the video frame and a slice to which the lost packet belongs, determine a location of a most important lost packet in the slice to which the lost packet belongs, where the most important lost packet is the lost packet having the largest influence on the video quality of a current slice, and determine the quality of the video frame according to the location of the most important lost packet in every slice.

In the embodiments, a method in the prior art that the video quality is determined only according to the number of lost packets and a packet loss rate is modified, and the locations of the most important lost packets is determined by analyzing the influence of the lost packet on other packets, and a damage degree or degree of intactness of the video frame is determined according to the most important lost packets, so as to determine the quality of the video frame. The method greatly improves the precision for evaluating the video quality.

BRIEF DESCRIPTION OF THE DRAWINGS

To illustrate the technical solutions according to the embodiments or in the prior art more clearly, the accompanying drawings for describing the embodiments or the prior art are introduced briefly in the following. Apparently, the accompanying drawings in the following description only show some embodiments, and persons of ordinary skill in the art can derive other drawings from the accompanying drawings without creative efforts.

DETAILED DESCRIPTION OF THE EMBODIMENTS

In order to make the objectives, features, and advantages of the embodiments more comprehensible, embodiments are further described in detail below with reference to accompanying drawings and specific implementations.

When a slice includes five, six, or even ten or more, scores of, or hundreds of packets, video macroblocks of the packets are correlated to each other. When a packet including some macroblocks is lost or has an error, because a subsequent packet in the slice need to be decoded according to a preceding packet (a source packet), in a case that the preceding source packet is lost, the subsequent packet cannot be decoded correctly regardless of whether the subsequent packet is lost, so video information cannot be obtained. In addition, when some packets including main content, for example, a sequence parameter set and an image parameter set, of a video frame are lost, it is caused that the whole video cannot be decoded correctly. Therefore, in these cases, the quality of the video cannot be simply measured according to a packet loss rate.

The technical solutions are described with reference to accompanying drawings and embodiments.

Figure 1:
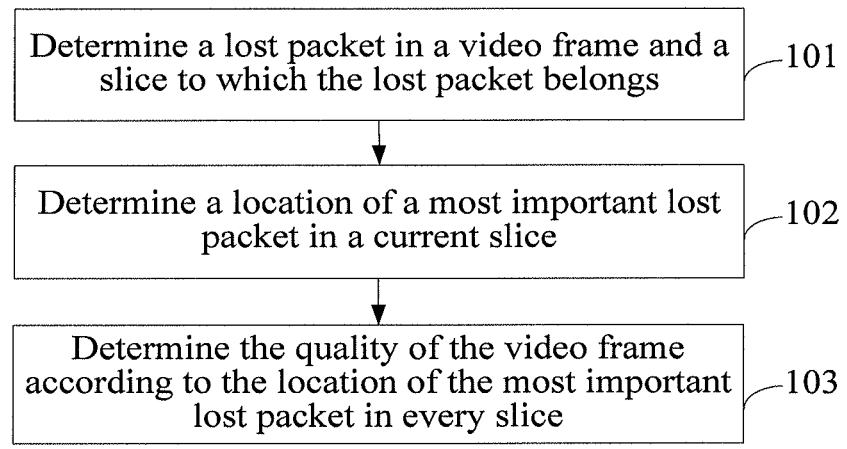
FIG. 1 is a flow chart of a method for evaluating video quality according to an embodiment.

Referring to FIG. 1, it is a flow chart of a method for evaluating video quality according to an embodiment.

The method may include:

Step 101: Determine a lost packet in a video frame and a slice to which the lost packet belongs.

A video is transmitted according to a video frame sequence (for example, IDR P B B P B B P . . . ), and a transmission sequence of video frames may not be consistent with a coding sequence of video frames, and therefore, before the influence of the video packet loss on the video quality is evaluated, it is needed to first determine a lost packet, and a video frame to which the lost packet belongs and a slice to which the lost packet belongs. A determination method may be that video frame information is acquired from a video transmission source, and may also be that video frame information is acquired by parsing received video packets. The parsing the received video packets may be parsing the received video packets by an evaluation apparatus itself, or may be acquiring a parsing result of the video packets from a parsing apparatus. If the video frame information is acquired from the video transmission source, when a coded video stream is packetized, the video transmission source determines a starting sequence of the video frames, the number n_Packets of packets in each frame, the number n_Slices of slices (Slice) of the video frame and even location information of every slice, so a receiving node may obtain information about the lost packet through comparison of the received packets with video frame information sent by the video source. If the video frame information needs to be obtained by parsing the video packets, a manner may be adopted: for a TS stream, the starting of a frame may be determined according to a valid payload start indicator, payload_unit_start_indicator, in a header of the TS, since the indicator for a starting packet in each frame is set to 1, in TS.

For a International Telecommunication Union Telecommunication Standardization Sector (ITU Telecommunication Standardization Sector, ITU-T) H.264/Advanced Video Coding (Advanced Video Coding, AVC) stream encapsulated by the Real-time Transport Protocol (Real-time Transport Protocol, RTP), different identifiers of an IDR frame, a P frame, and a B frame exist at a network abstraction layer (Network Abstraction Layer, NAL), by which the frame to which the lost packet belongs may be determined.

Hereinbefore, the situations for the TS stream and the RTP stream are introduced, and are similar to those of other encapsulation manners.

Step 102: Determine a location of a most important lost packet in a current slice.

In this step, in the slice to which the lost packets belong, the most important lost packet may be determined according to a reference relation between all packets in the slice, and thereby a location of the most important lost packet in the slice is obtained, where the most important lost packet is the lost packet having the largest influence on the video quality of the current slice, that is, the lost packet influencing the largest number of the macroblocks or the packets in the current slice.

A reference relation exists between all packets in the same slice, for example, a subsequent packet needs to be decoded according to a preceding packet (a source packet). If the preceding source packet is lost, the subsequent packet cannot be decoded correctly regardless of whether the subsequent packet is lost, so video information cannot be obtained. In this case, according to locations, for example, serial numbers, of the lost packets in the slice, a location of a most important lost packet may be determined, and meanwhile, a maximum number of other packets influenced by the lost packets may also be determined. For example, a slice includes 50 packets, and packet serial numbers are (10000-10049), where packets 10001 and 10048 are lost. In this case, the loss of the packet 10001 directly causes that packets 10002-10049 cannot be decoded; and the loss of the packet 10048 causes that packet 10049 cannot be decoded. It may be found through comparison that a most important lost packet in the slice is the packet 10001, and a maximum number of packets that are in the slice and influenced by the lost packet 10001 is 49 (including the lost packet).

Other reference relations, for example, a functional relation, may exist between all packets in the same slice, which correlates with a coding, decoding, and transmission order of the video. In this case, according to the correlation relation and the locations of the lost packets in the slice, the location of the most important lost packet may still be determined, and meanwhile, the maximum number of other packets influenced by the lost packet may also be determined. Taking the slice including 50 packets as an example again, the packet serial number are (10000-10049), where the packets 10001 and 10048 are lost, and a difference from the foregoing example is that a preceding packet needs to be decoded according to a subsequent packet, if the subsequent packet is lost, the preceding packet cannot be decoded correctly regardless of whether the preceding packet is lost, so the video information cannot be obtained. In the slice, the most important lost packet is the packet 10048, and the maximum number of packets that are in the slice and influenced by the lost packet 10048 is 49.

Step 103: Determine the quality (Quality_VideoFrame) of the video frame according to the location of the most important lost packet in every slice.

In this step, according to the location of the most important lost packet in every slice, the maximum number of the packets influenced by the lost packet may be obtained, and then a quality influence ratio (a damage ratio) is measured by using the maximum number of the packets that are influenced by the lost packet and are in every slice and the total number of packets in the video frame; and the number of the packets that are not influenced by the most important lost packet may also be obtained, and then a degree of intactness of the video frame is measured by using the number of the packets that are not influenced by the most important lost packet and the total number of the packets in the video frame, or the quality of the video frame is measured by using the maximum number of the packets influenced by the lost packet and other packets in the video frame, or a threshold may be set and the quality of the video frame is finally obtained by comparing the aforesaid result with the corresponding threshold.

In this embodiment, a method in the prior art that the video quality is determined only according to the number of lost packets and a packet loss rate is modified, and the location of the most important lost packet is determined by analyzing the influence of the lost packet on other packets, and a damage degree or degree of intactness of the video frame is determined according to the most important lost packet, so as to determine the quality of the video frame. The method greatly improves the precision for evaluating the video quality.

Figure 2:
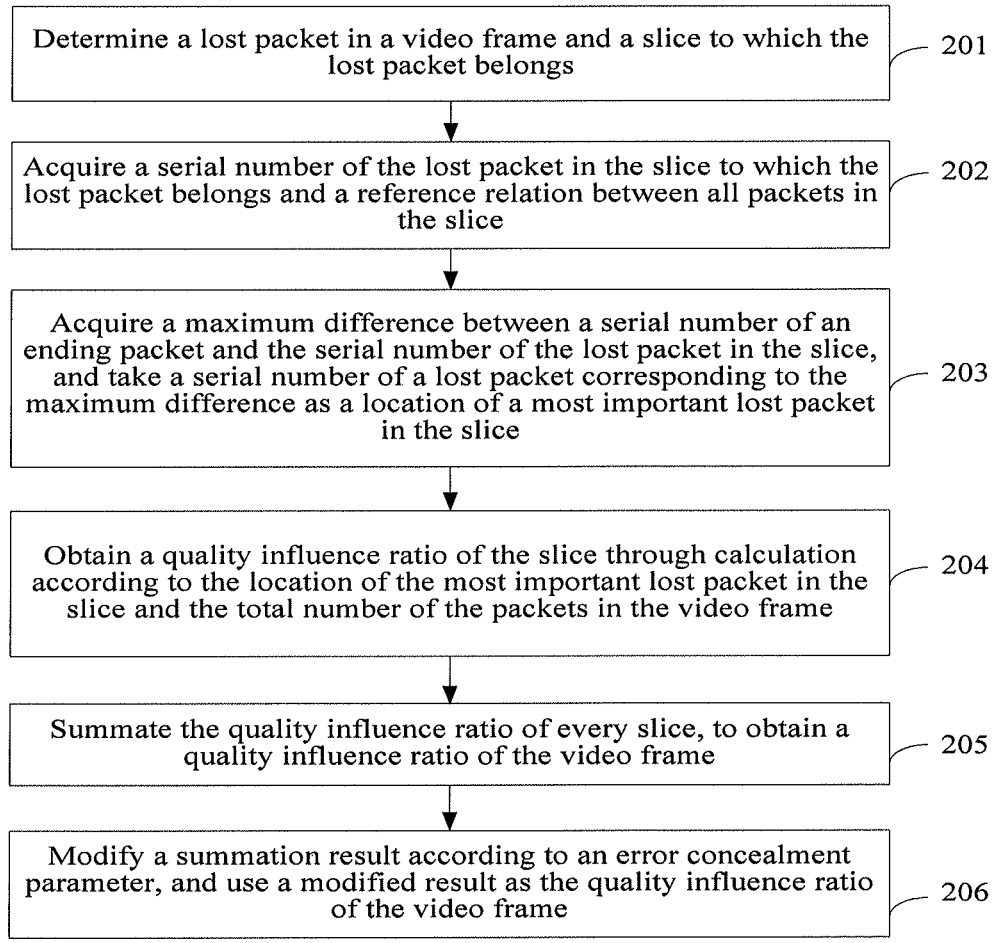
FIG. 2 is a flow chart of a method according to a first embodiment.

Referring to FIG. 2, it is a flow chart of a method according to a first embodiment.

The method may include:

Step 201: Determine a lost packet in a video frame and a slice to which the lost packet belongs.

The step is similar to step 101, and is not detailed again herein.

In this embodiment, the video frame includes n_Slices slices, n_Packets packets, a serial number of a starting packet in the whole video frame is seqNumStart, a serial number of an ending packet is seqNumEnd, a starting serial number of an $i^{th}$ slice is seqNumSliceStart_i, a serial number of an ending packet in the $i^{th}$ slice is seqNumSliceEnd_i, a range of serial numbers of packets in every slice is approximately seqNumStart to seqNumSliceEnd_1, seqNumSliceStart_2 to seqNumSliceEnd_2, . . . and seqNumSliceStart_(n_Slices) to seqNumEnd, respectively. The sequence includes a case in which data of an ending part of a slice and data of a starting part of a next slice are grouped into a same packet, and in this case, seqNumSliceStart_(i30 1)=seqNumSliceEnd_i.

It is found through detection that m packets are lost in the video frame, and it is found through analysis that the lost packets are distributed in k slices (k<=n_Slices), where j is used to represent the slices to which the lost packets belong. For example, if n_Slices=5, and k=3, according to the difference of the lost packets, j may be slices 1, 2, and 3, slices 1, 2, and 4, slices 1, 2, and 5, slices 2, 3, and 4, slices 2, 3, and 5, or slices 3, 4, and 5.

Step 202: Acquire a serial number of the lost packet in the slice to which the lost packet belongs and a reference relation between all packets in the slice.

It is assumed that a range of serial numbers of packets in a slice is 0-100, and serial numbers of lost packets in the slice are 10, 20-45, and 55. In this embodiment, the reference relation between all packets in the slice is that a subsequent packet needs to be decoded according to a preceding packet, so as to restore a video image.

Step 203: Acquire a maximum difference between a serial number of an ending packet and the serial number of the lost packet in the slice, and take a serial number of a lost packet corresponding to the maximum difference as a location of a most important lost packet in the slice.

It is assumed that lost packets exist in a slice j, according to the reference relation between all packets, a serial number of a lost packet having the maximum difference with a serial number seqNumSliceEnd_j of an ending packet is seqNumLatest_j, that is, a serial number that is closest to a starting location of a sequence range of every Slice, and in the slice j, the maximum number of packets influenced by the lost packet is seqNumSliceEnd_j-seqNumLatest j+1. The serial number of the ending packet in every Slice may be determined by directly obtaining from a source end.

Taking specific data in step 202 as an example, it can be known from locations of the lost packets 10, 20-45, and 55 in the slice and the correlation relation between the packets that, if the packet 10 is lost, all subsequent packets in the slice cannot be decoded correctly, so the video image cannot be correctly restored. Accordingly, the packet 10 is the most important lost packet in the slice, and then the maximum number of the packets influenced by the lost packet may be determined, so as to calculate the video quality subsequently. In practical operations, a maximum difference between the serial number of the ending packet and the serial number of the lost packet in the slice is 100-10 according to calculation, so that the most important lost packet in the slice is determined to be the lost packet corresponding to the maximum difference, that is, the packet 10, and then the maximum number of the packets influenced by the lost packet may be determined to be 91.

In addition, if the serial number seqNumSliceStart_j of the starting packet to the serial number seqNumSliceEnd_j of the ending packet in the slice are not sorted in an order from small to large or from large to small, modification of the order of the serial numbers is needed. For example, if a range of serial numbers of packets in a slice is (65486-65535-0-49), it indicates that the serial numbers of the packets is recycled once. Therefore, in this step, before the acquiring the maximum difference between the serial number of the ending packet and the serial number of the lost packet in every slice, the method further includes:

modifying the serial numbers of the packets in the slice, or modifying the serial numbers of the packets in the video frame, so that the serial number of the starting packet in the slice is less than the serial number of the ending packet, where for example, the serial numbers of the 100 packets in the slice (65486-65535-0-49) are modified to be (0-99) respectively, that is a new serial number corresponding to 65486 is 0, and a new serial number corresponding to 49 is 99; and then acquiring a maximum difference between the serial number of the ending packet after modification and the serial number of the lost packet after modification in every slice.

If several packets having the original serial numbers of 65496, 10, and 20-45 are lost, according to the new serial numbers after modification, a new serial number corresponding to 65496 is 10, and a maximum difference between the serial number of the ending packet after modification and the serial number of the lost packet in the slice is 100-10 according to calculation, so the most important lost packet in the slice is determined to be the packet 10 after modification of the serial number, and the maximum number of the packets influenced by the lost packet is 91.

Step 204: Obtain a quality influence ratio of the slice through calculation according to the location of the most important lost packet in the slice and the total number of the packets in the video frame.

First, according to the location of the most important lost packet in the slice, the number of the packets that are in the slice and influenced by the most important lost packet is calculated; and then, a ratio of the number of the packets that are in the slice and influenced by the most important lost packet to the total number of packets in the video frame is calculated, thereby obtaining the quality influence ratio of the slice. For example, the quality influence ratio of the slice j is:

$$\frac{seqNumSliceEnd\_j - seqNumLatest\_j + 1}{n\_Packets}$$

Step 205: Summate the quality influence ratio of every slice, to obtain a quality influence ratio of the video frame:

Σ(seqNumSliceEnd_j−seqNumLatest_j+1)/n_Packets

The ratio may be directly used as the quality influence ratio of the video frame, and the video frame may be evaluated by using the influence ratio. Definitely, a calculation order of step 204 and step 205 may be adjusted as desired. For example, according to a mathematical algorithm, the number of related packets in every slice is summated first, and then the ratio to the number of the total packets in the video frame is calculated.

In a case that there is only 1 Slice in 1 video frame, a quality evaluation formula of the video frame is (seqNumEnd−seqNumLatest+1)/n_Packets If an error concealment (Error Concealment) factor of the video frame is considered, the ratio obtained in step 205 may be modified in step 206.

Step 206: Modify a summation result according to an error concealment parameter, and use a modified result as the quality influence ratio of the video frame.

ecFactor*Σ(seqNumSliceEnd_j−seqNumLatest_j+1)/ n_Packets

The error concealment parameter recFactor is a real number having a value in the range of (0-1), where a typical value may be about 0.8.

In the case that there is only 1 Slice in 1 video frame, a quality evaluation formula of the video frame is:

ecFactor*(seqNumEnd−seqNumLatest+1)/n_Packets

The order of the foregoing steps may be properly adjusted as desired, and the present invention is not limited to the foregoing sequence.

In this embodiment, the most important lost packet and the maximum number of the packets that are in the slice and influenced by the lost packet are determined by calculating the maximum difference between the serial number of the ending packet and the serial number of the lost packet in the slice, so that the quality of the video frame may be determined according to the maximum number, which greatly improves the precision for evaluating the video quality. In addition, the introduction of the error concealment parameter makes the obtained influence rate of the video quality more accurate.

The process of calculating the quality influence ratio of the video frame in the embodiment may further include: performing simplified calculation on the quality influence ratio of the video frame to obtain a simplified video frame quality, which is specifically as follows.

Figure 3:
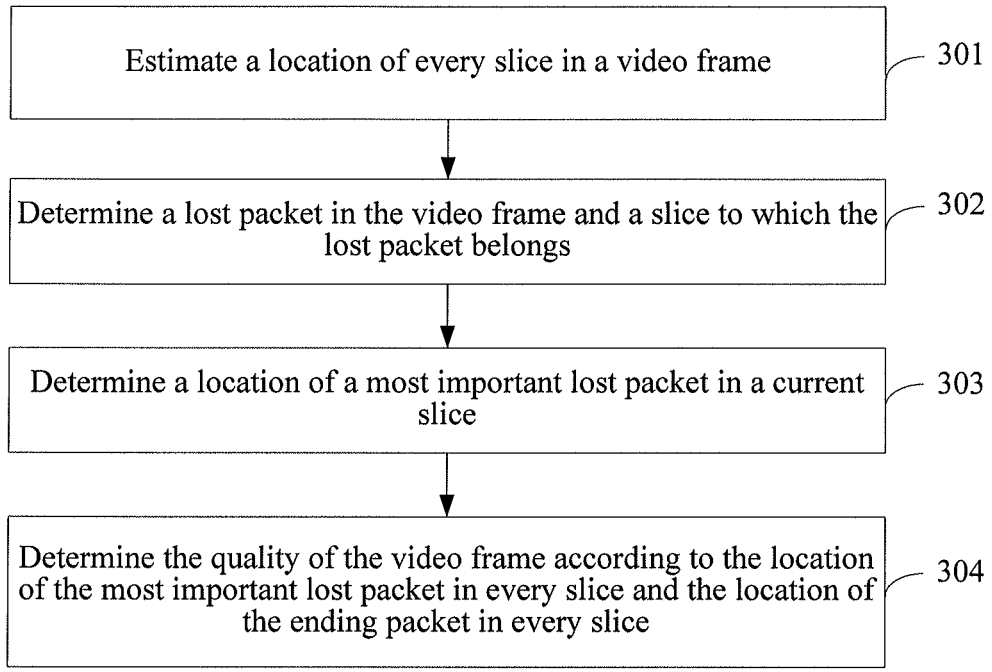
FIG. 3 is a flow chart of a method according to a second embodiment.

Referring to FIG. 3, it is a flow chart of a method according to a second embodiment.

The embodiment shown in FIG. 3 may be applicable to a method for evaluating video quality in a case that location information of every slice in a video frame cannot be obtained (for example, the slice location information sent by a video transmission source is lost, or a starting packet or an ending packet of the slice is lost). The method may include:

Step 301: Estimate a location of every slice in a video frame.

For example, location information of slices may be obtained from a previous video frame and a next video frame, and the location of every slice in the current video frame, that is, a serial number of an ending packet or a serial number of a starting packet in every slice, may be estimated according to the location information. Because picture content in the previous video frame and picture content in the next video frame are usually similar, and the dividing of the slices may also be the same or similar, the location of every slice in the current video frame may be estimated by using the location information of the slices in the previous video frame and the next video frame. For example, if slice information of the current video frame is lost, the previous video frame is divided into two slices, and a division location between the two slices is at a location where first 48% of total packets in the previous video frame end, the location where the first 48% of total packets in the current video frame end may be used as a division location between two slices in the current video frame.

Other estimation manners may also be adopted. For example, in order to avoid the parsing of the packets, so as to reduce the complexity of an apparatus, estimation may be conducted by adopting a manner of equally allocating the total number of packets in the video frame to the slices in the video frame. That is, according to the total number of the packets in the video frame and the number of the slices in the video frame, the total number of packets in the video frame is equally allocated to the slices in the video frame, so as to determine the location of every slice, for example, the location of the ending packet in every slice, as shown by Formula 1 below:

$$seqNumSliceEnd\_i \approx seqNumStart + i*n\_Packets/n\_Slices$$

or $$seqNumSliceEnd\_i \approx seqNumEnd + (i - n\_Slices)*n\_Packets/n\_Slices$$

or $$seqNumSliceEnd\_i \approx \frac{\left[\begin{array}{c} seqNumEnd + seqNumStart + \\ (2*i - n\_Slices)*n\_Packets/n\_Slices \end{array}\right]}{2}$$

Step 302: Determine a lost packet in the video frame and a slice to which the lost packet belongs.

Step 303: Determine a location of a most important lost packet in a current slice.

Steps 302 and 303 are similar to those in the foregoing embodiment, and are not detailed again herein.

Step 304: Determine the quality of the video frame according to the location of the most important lost packet in every slice, and the location of the ending packet in every slice.

For example, a quality influence ratio of the slice may be calculated according to the location of every slice in the video frame, where the location of every slice is estimated in 301, by using a method similar to that in 204 in the embodiment shown in FIG. 2, and then a quality influence ratio of the video frame is further calculated. For example, the quality influence ratio of the video frame in a case that the location of every slice in the video frame is estimated by adopting a manner of equally allocating the number of the packets in every slice is given by a formula below:

$$(k*seqNumStart-\Sigma seqNumLatest\_j+k)/n\_Packets+ \Sigma j/n\_Slices; \text{ or}$$

$$(k*seqNumEnd-\Sigma seqNumLatest\_j+k)/n\_Packets+ \Sigma(j-n\_Slices)/n\_Slices$$

where k represents that a packet loss occurs in k slices.

In this embodiment, a summation result may be modified according to an error concealment parameter, and a modified result is used as the quality influence ratio of the video frame.

In this embodiment, the location of the most important lost packet is determined by analyzing the influence of the lost packet on other packets, a damage degree or degree of intactness of the video frame is determined according to the most important lost packet, and the location of the ending packet in every slice is determined by using a simple algorithm, which may thereby determines the quality of the video frame with a high efficiency. The method greatly improves the precision for evaluating the video quality.

In a video sequence, after the quality of a certain video frame is obtained, the quality of a frame subsequent to this video frame may be further obtained, so as to determine the quality evaluation of the whole video sequence. Description is made through a specific embodiment below.

A method for determining the quality of the video sequence may include:

Step a: Determine the quality of a video frame to which lost packet belongs.

Step b: Determine the number of subsequent video frames influenced by the video frame.

Step c: Determine the quality Quality_VideoSequence of the video sequence according to the quality of the video frame and the number of the video frames influenced by the video frame.

In step a, for determining the quality of the video frame, the quality Quality_VideoFrame of the video frame, where the quality Quality_VideoFrame of the video frame is determined according to the location of the most important lost packet in every slice, may be used, or other manners may be adopted, for example, Quality_VideoFrame$=^{lost\_Packets/n\_Packets}$, where lost_Packets is the total number of the lost packets in the video frame. For the whole video sequence formed by the current video frame and subsequent video frames, the quality of the video sequence may be represented by a quality influence ratio of the video sequence, and may be specifically obtained by multiplying a quality influence ratio of the current video frame by the number of the video frames influenced by the current video frame, for example, by using a calculation formula below:

$$Quality\_VideoSequence=n\_refFrames*Quality\_VideoFrame$$

In the formula, n_refFrames is the number of the video frames (including the current video frame) influenced by the current video frame, that is, the total number of the frames influencing the video quality. The subsequent frames influenced by the current video frame need to be decoded with the current video frame as a reference frame. n_refFrames does not exceed a size of a group of pictures (Group of Pictures, GOP) of the video sequence. Therefore, the longer the GOP is, the greater the n_refFrames may be, that is, the more the subsequent video frames influenced by the current video frame may be, and the higher the quality influence ratio of the video sequence may be. Description is made through a specific embodiment below.

Figure 4:
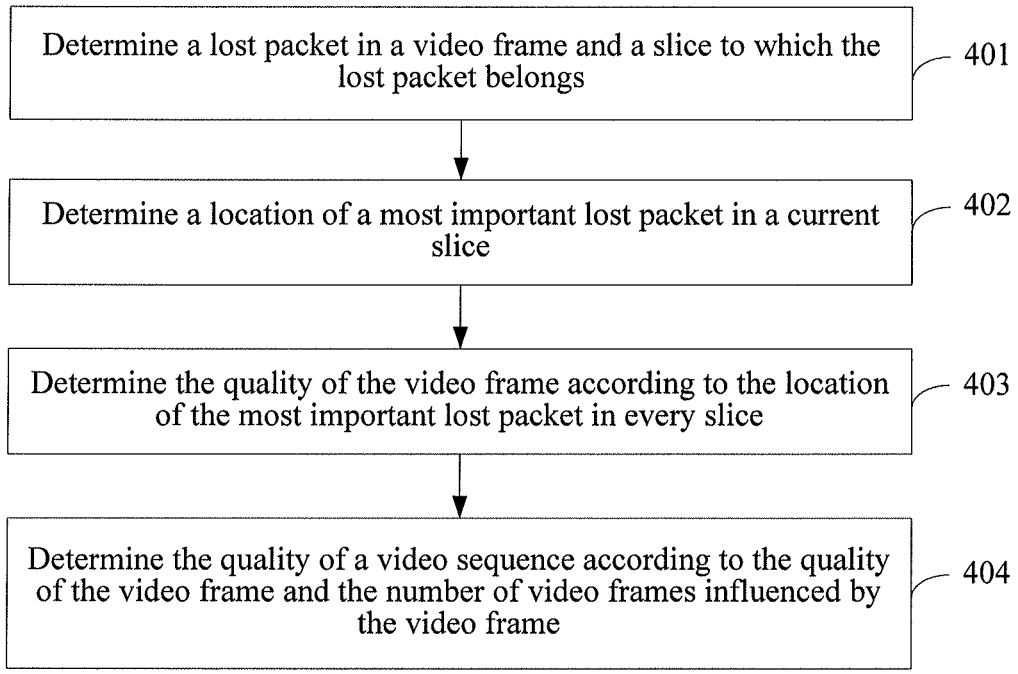
FIG. 4 is a flow chart of a method according to a third embodiment.

Referring to FIG. 4, it is a flow chart of a method according to a third embodiment.

The method may include:

Step 401: Determine a lost packet in a video frame and a slice to which the lost packet belongs.

Step 402: Determine a location of a most important lost packet in a current slice.

Step 403: Determine the quality of the video frame according to the location of the most important lost packet in every slice.

Steps 401 to 403 are similar to the corresponding steps in the foregoing embodiments, and are not detailed again herein.

Step 404: Determine the quality (Quaitly_VideoSequence) of a video sequence according to the quality of the video frame and the number of video frames influenced by the video frame.

In this embodiment, for the whole video sequence formed by the current video frame and subsequent video frames, the quality of the video sequence may be represented by a quality influence ratio of the video sequence, and may be specifically obtained by multiplying a quality influence ratio of the current video frame by the number of the video frames influenced by the current video frame, for example, by using a calculation formula below:

$$n\_refFrames*\Sigma(seqNumSliceEnd\_j-seqNumLatest\_j+1)/n\_Packets$$

In the formula, n_refFrames is the number of the video frames (including the current video frame) influenced by the current video frame, that is, the total number of the frames influencing the video quality. The subsequent frames influenced by the current video frame need to be decoded with the current video frame as a reference frame. n_refFrames does not exceed a size of a group of pictures (Group of Pictures, GOP) of the video sequence. Therefore, the longer the GOP is, the greater the n_refFrames may be, that is, the more the subsequent video frames influenced by the current video frame may be, and the higher the quality influence ratio of the video sequence may be.

If a location of every slice in the video frame is obtained through estimation, an estimation manner in which the number of packets in every slice is equally allocated is adopted, a formula for a quality influence ratio of the video sequence is obtained according to Formula 1 in the foregoing embodiment:

$$n\_refFrames*[(k*seqNumStart-\Sigma seqNumLatest\_j+k)/ n\_Packets+\Sigma j/n\_Slices]$$

or $$n\_refFrames*[(k*seqNumEnd+k-\Sigma seqNumLatest\_j)/ n\_Packets+\Sigma(j-n\_Slices)/n\_Slices]$$

In a case that there is only 1 Slice in 1 video frame, a quality evaluation formula of the video frame is $$n\_refFrames*(seqNumEnd-seqNumLatest+1)n\_Packets$$

If an error concealment parameter (ecFactor) is considered, a calculation formula of the quality influence ratio of the video sequence is:

$$ecFactor* n\_refFrames*\Sigma(seqNumSliceEnd\_j- seqNumLatest\_j+1)/n\_Packets$$

The foregoing formula for evaluating the video quality may be converted into a corresponding video MOS (Mean Opinion Score) value.

In this embodiment, the quality of the whole video sequence is obtained through the quality of a certain video frame, so that the quality evaluation of the video sequence is rapidly and conveniently achieved.

Figure 5:
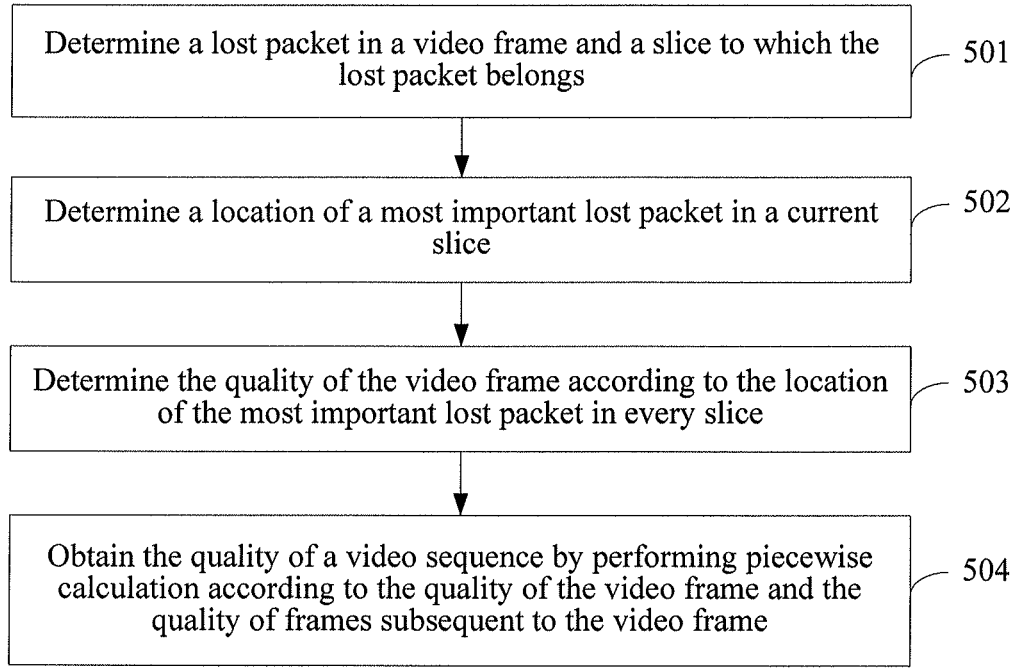
FIG. 5 is a flow chart of a method according to a fourth embodiment.

Referring to FIG. 5, it is a flow chart of a method according to a fourth embodiment.

The method may include:

Step 501: Determine a lost packet in a video frame and a slice to which the lost packet belongs.

Step 502: Determine a location of a most important lost packet in a current slice.

Step 503: Determine the quality of the video frame according to the location of the most important lost packet in every slice.

Steps 501-503 are similar to the corresponding steps in the foregoing embodiments, and are not detailed again herein.

Step 504: Obtain the quality of a video sequence through piecewise calculation according to the quality of the video frame and the quality of a subsequent frame influenced by the video frame.

The video frame and the subsequent frame are all included in the video sequence.

The piecewise calculation may be a calculation performed by using a variety of methods according to factors such as a packet loss situation of the subsequent frame or a quality influence ratio of the subsequent frame, and different situations are described with reference to examples below.

If there is no packet loss in the subsequent frame, or there is a packet loss in the subsequent frame but a quality influence ratio of the frame obtained through the foregoing method is less than or equal to that of the preceding video frame, the quality of the video frame is directly used as the quality of the video sequence.

For example, if in a video sequence GOP=30 (I1 B2 P3 B4 P5 B6 P7 ... B28 P29 B30 I31), a quality influence ratio of an I frame is 55%, and there is no packet loss in subsequent frames B2 P3 B4 P5 B6 P7 ... B28 P29 B30 I31 of the I frame or the quality influence ratio of every of the subsequent frame is less than or equal to 55%, 55% may be directly used as the quality influence ratio of the video sequence, and a calculation manner for converting, by assuming that a quality influence ratio is 100 in the case that a picture loss of one frame occurs, a total quality influence ratio of the video sequence is: 100×55%×(29+1)~1650.

If there is a packet loss in a subsequent frame, and a quality influence ratio of the subsequent frame with a packet loss is greater than that of the preceding video frame, the piecewise calculation of the quality influence ratio of the video sequence may be implemented through the following method: first judging whether the subsequent frame is a reference frame and number of frames influenced by the subsequent frame, multiplying the quality influence ratio of each frame by the corresponding number of influenced frames, and then summating every product, to obtain the quality influence ratio of the total video sequence.

For example, in the video sequence, besides that a packet of the I frame is lost and the quality influence ratio is 55%, a packet loss also occurs in a P5 video frame, and a quality influence ratio is 85%, the number of frames influenced by the I frame is 4 (I1B2P3B4), and the number of frames influenced by the P5 frame as a reference frame is 26 (P5B6P7 ... B28P29B30). In this case, a calculation manner for converting, by assuming that a quality influence ratio is 100 in the case that a picture loss of one frame occurs, a total quality influence ratio of the video sequence is: 100×(55%×4+85%×26)~2430. If there is also a packet loss in a frame subsequent to P5 frame, and a quality influence ratio is greater than 85%, similar processing is performed.

If a packet loss also occurs in a B4 frame before the P5 frame, and it is assumed that a quality influence ratio of the B4 frame is 75%, as the B4 frame is not referred to by other video frames, the number of influenced frames is just 1 (B4), in this case, a calculation manner for converting a total quality influence ratio of the video sequence into 0 to 100 is: 100×(55%×3+75%×1+85%×26)~2450.

In this embodiment, the packet loss situation of each video frame is analyzed, the number of the corresponding influenced frames is obtained, and a more precise quality of the whole video sequence is obtained through the piecewise calculation of the quality influence ratio of each frame and the number of the influenced frames.

Hereinbefore, the method for evaluating video quality is described in detail, and an apparatus and a system for implementing the method are described with reference to specific embodiments below.

Figure 6:
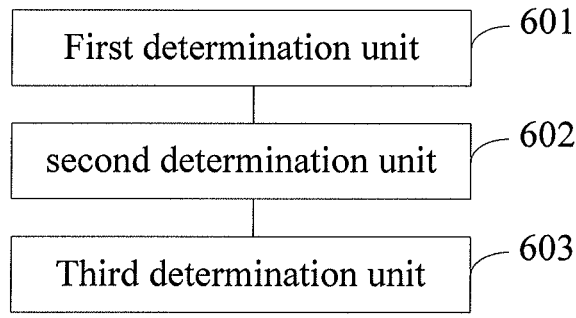
FIG. 6 is a schematic structural diagram of an apparatus for evaluating video quality according to an embodiment.

Referring to FIG. 6, it is a schematic structural diagram of an apparatus for evaluating video quality according to an embodiment.

The apparatus for evaluating video quality may include a first determination unit 601, a second determination unit 602, and a third determination unit 603.

The first determination unit 601 is configured to determine a lost packet in a video frame and a slice to which the lost packet belongs.

The second determination unit 602 is configured to determine a location of a most important lost packet in the slice to which the lost packet belongs, where the most important lost packet is the lost packet having the largest influence on the video quality of a current slice.

The third determination unit 603 is configured to determine the quality of the video frame according to the location of the most important lost packet in every slice.

The first determination unit 601 may acquire video frame information from a video transmission source end or directly parse received video packets, to determine the lost packet in the video frame and the slice in which the lost packet resides, or receive a parsing result of the video packets from a network apparatus, and further determine the lost packet in the video frame and the slice in which the lost packet resides according to the parsing result of the video packets. The second determination unit 602 determines that a lost packet which influences the largest number of packets in every slice is the most important lost packet, according to a correlation relation between all packets in the video frame, or a coding, decoding, or transmission order of the video frame, and then the third determination unit 603 performs an operation on the location of the most important lost packet and the total number of the packets in the video frame packet, to determine the quality of the video frame.

The influence of the lost packet on other packets is analyzed by the first determination unit 601 and the second determination unit 602 in the apparatus, to determine the most important lost packet, so that the third determination unit 603 may determine the quality of the video frame according to the most important lost packet. The apparatus greatly improves the precision for evaluating the video quality.

In another embodiment, the apparatus may further include an estimation unit, configured to estimate a location of every slice in the video frame. The estimation unit may specifically obtain location information of slices from a previous video frame and a next, and estimate, according to the location information, the location of every slice, that is, a serial number of an ending packet or a serial number of a starting packet in every slice, in the current video frame. Because picture content in the previous video frame and picture content in the next video frame are usually similar, and the dividing of the slices may also be the same or similar, the location of every slice in the current video frame may be estimated by using the location information of the slices in the previous video frame and next video frame. For example, in a case that slice information of the current video frame is lost, the previous video frame is divided into two slices, and a division location between the two slices is at a location where first 48% of total packets in the previous video frame end, the location where the first 48% of total packets in the current video frame end may be used as a division location between two slices in the current video frame. The estimation unit may also perform estimation by adopting a manner in which the total number of packets in the video frame is equally allocated to the slices in the video frame, that is, the total number of packets in the video frame is equally allocated to the slices in the video frame according to the total number of the packets in the video frame and the number of the slices in the video frame, so as to determine the location of every slice, for example, the location of the ending packet in every slice.

Figure 7:
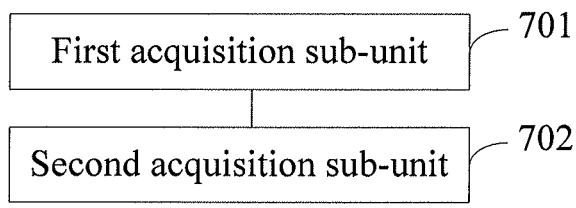
FIG. 7 is a schematic structural diagram of a second determination unit according to an embodiment.

Referring to FIG. 7, it is a schematic structural diagram of a second determination unit according to an embodiment.

In this embodiment, the second determination unit may include a first acquisition sub-unit 701, and a second acquisition sub-unit 702.

The first acquisition sub-unit 701 is configured to acquire a serial number of a lost packet in a slice to which the lost packet belongs and a reference relation between all packets in the slice.

The second acquisition sub-unit 702 is configured to acquire a maximum difference between a serial number of an ending packet and the serial number of the lost packet in the slice, and take a serial number of a lost packet corresponding to the maximum difference as a location of a most important lost packet in the slice.

After the first acquisition sub-unit 701 acquires the serial number of the lost packet in the slice to which the lost packet belongs, the second acquisition sub-unit 702 calculates the maximum difference between the serial number of the ending packet and the serial number of the lost packet in every slice according to the reference relation between all packets in the video frame, that is, a subsequent packet needs to be decoded according to a preceding packet in the embodiment, so as to restore a video image, and inputs the serial number of the lost packet corresponding to the maximum difference, as the location of the most important lost packet in every slice, into the third determination unit for evaluation of the video quality.

In another embodiment, before the second acquisition sub-unit acquires the maximum difference between the serial number of the ending packet and the serial number of the lost packet in every slice, if a serial number of a starting packet in the slice is greater than the serial number of the ending packet, the second determination unit may further include a first modification sub-unit, configured to modify serial numbers of the packets in the slice. In this case, the second acquisition sub-unit specifically acquires a maximum difference between a serial number of the ending packet after modification and a serial number of the lost packet after modification in every slice, and a serial number of a lost packet corresponding to the maximum difference is used as the location of the most important lost packet in the slice.

In the foregoing embodiment, the maximum difference between the serial number of the ending packet and the serial number of the lost packet in the slice is calculated by the first and second acquisition sub-unit, so as to determine the most important lost packet, so that the third determination unit may perform the quality evaluation of the subsequent video frame.

Definitely, the second determination unit may also obtain the location of the most important lost packet in every slice by using different methods according to the difference of the reference relation between all packets in the video frame, reference can be made to the descriptions in the corresponding part in the method embodiments, and details are not detailed again herein.

Figure 8:
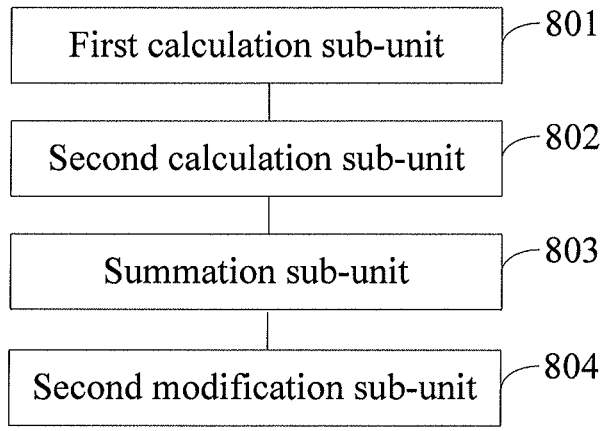
FIG. 8 is a schematic structural diagram of a third determination unit according to an embodiment.

Referring to FIG. 8, it is a schematic structural diagram of a third determination unit according to an embodiment.

In this embodiment, the third determination unit may include a first calculation sub-unit 801, a second calculation sub-unit 802, and a summation sub-unit 803.

The first calculation sub-unit 801 is configured to calculate the number of packets that are in a slice and influenced by a most important lost packet, according to a location of the most important lost packet in the slice.

The second calculation sub-unit 802 is configured to calculate a ratio of the number of the packets that are in the slice and influenced by the most important lost packet to the total number of packets in a video frame, to obtain a quality influence ratio of the slice.

The summation sub-unit 803 is configured to summate the quality influence ratio of every slice, to obtain a quality influence ratio of the video frame.

A summation result obtained by the summation sub-unit 803 may be directly used as the quality influence ratio of the video frame, or the third determination unit may further include a second modification sub-unit 804, configured to modify the summation result by using an error concealment parameter after the summation, and a modified result is used as the quality influence ratio of the video frame. The quality of the video frame is represented by the quality influence ratio of the video frame.

In this embodiment, the third determination unit may obtain the quality influence ratio of the video frame by using the first calculation sub-unit 801, the second calculation sub-unit 802, and the summation sub-unit 803, and the quality of the video frame is represented by the quality influence ratio of the video frame, which greatly improves the precision for evaluating the video quality. Moreover, the introduction of the error concealment parameter by the second modification sub-unit 804 may make the obtained influence rate of the video quality more accurate, and the simplified calculation performed by a simplified sub-unit may more rapidly and conveniently obtain the quality influence ratio of the video frame.

Figure 9:
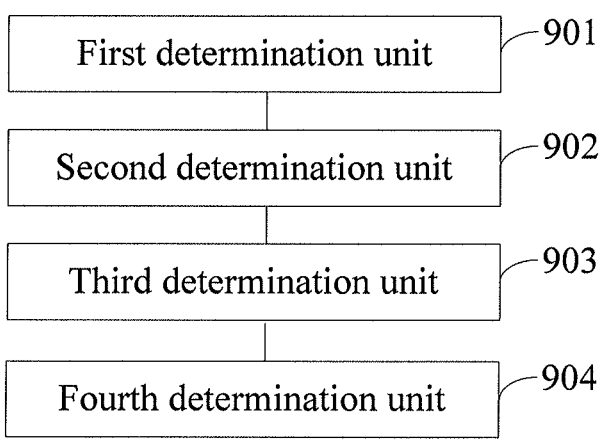
FIG. 9 is a schematic structural diagram of another apparatus for evaluating video quality according to an embodiment.

Referring to FIG. 9, it is a schematic structural diagram of another apparatus for evaluating video quality according to an embodiment.

The apparatus may further include a fourth determination unit 904, in addition to a first determination unit 901, a second determination unit 902 and a third determination unit 903.

The first determination unit 901, the second determination unit 902 and the third determination unit 903 are similar to those in the foregoing embodiment, and are not detailed again herein.

The fourth determination unit 904 is configured to determine the quality of a video sequence according to the quality of a video frame and the number of frames included in the video sequence by the video frame.

In this embodiment, the fourth determination unit 904 obtains the quality of the whole video sequence through the quality of a certain video frame, so that the quality evaluation of the video sequence is rapidly and conveniently achieved.

Figure 10:
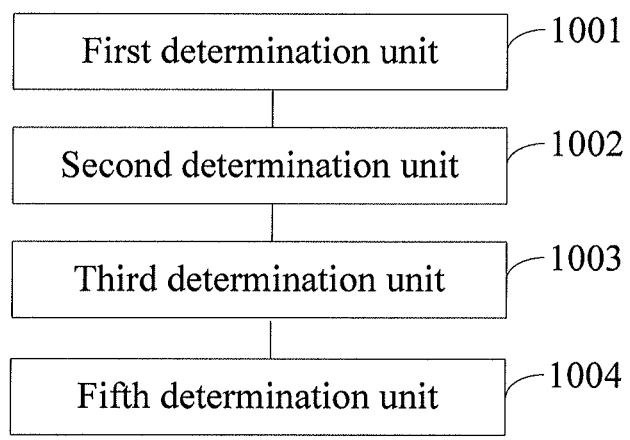
FIG. 10 is a schematic structural diagram of another apparatus for evaluating video quality according to an embodiment.

Referring to FIG. 10, it is a schematic structural diagram of another apparatus for evaluating video quality according to an embodiment.

The apparatus may further include a fifth determination unit 1004, in addition to a first determination unit 1001, a second determination unit 1002 and a third determination unit 1003.

The first determination unit 1001, the second determination unit 1002 and the third determination unit 1003 are similar to those in the foregoing embodiment, and are not detailed again herein.

The fifth determination unit 1004 is configured to obtain the quality of a video sequence by performing piecewise calculation according to the quality of a video frame and the quality of a subsequent frame influenced by the video frame.

In this embodiment, the fifth determination unit 1004 analyzes packet loss situation of each video frame, acquires the corresponding number of influenced frames, and obtains the quality of the video sequence more precisely through piecewise calculation of a quality influence ratio of each frame and the number of the corresponding influenced frames.

Figure 11:
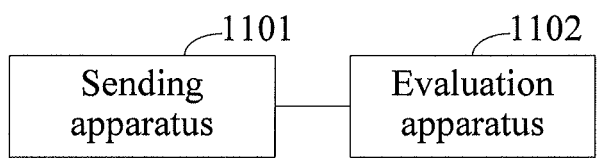
FIG. 11 is a schematic structural diagram of a system for evaluating video quality according to an embodiment.

Referring to FIG. 11, it is a schematic structural diagram of a system for evaluating video quality according to an embodiment.

The system may include:
a sending apparatus 1101, configured to generate and send a video packet; and
an evaluation apparatus 1102, configured to determine a lost packet in a video frame sent by the sending apparatus 1101 and a slice to which the lost packet belongs, determine a location of a most important lost packet in the slice to which the lost packet belongs, where the most important lost packet is the lost packet having the largest influence on the video quality of a current slice, and determine the quality of the video frame according to the location of the most important lost packet in every slice.

The evaluation apparatus 1102 may acquire video frame information from the sending apparatus 1101 and determine, according to the video frame information, the location of the most important lost packet in the slice to which the lost packet belongs. In this case, the sending apparatus 1101 is further configured to acquire the video frame information when a video stream is packetized, and send the video frame information to the apparatus 1102, where the video frame information may include one or more of the following: a starting sequence of the video frame, the number of packets in each frame, the number of slices in the video frame, and location information of every slice. The evaluation apparatus 1102 may further parse received video packets to obtain the video frame information, so as to determine the location of the most important lost packet in the slice to which the lost packet belongs. The evaluation apparatus 1102 may further acquire a parsing result of the video packets from a parsing apparatus, to determine the location of the most important lost packet in the slice to which the lost packet belongs, where the parsing apparatus parsing the received video packets after receiving the video packets sent by the sending apparatus 1101, to acquire the video frame information, and sends the parsing result to the evaluation apparatus 1102.

For specific implementation methods of the system, and the apparatuses, and units in the system, reference may be made to the descriptions in the corresponding part in the foregoing embodiments, and are not detailed again herein.

Those of ordinary skill in the art should understand that all or a part of the steps of the method according to the embodiments may be implemented by a program instructing relevant hardware. The program may be stored in a computer readable storage medium. The storage medium may be a ROM/RAM, a magnetic disk, or an optical disk.

The foregoing descriptions are merely exemplary embodiments, but are not intended to limit the claims. Many modification, equivalent replacements, or improvements may be made to the embodiments. Such modified embodiments are understood to fall with the scope of the claims.

What is claimed is:

1. A method for evaluating video quality, comprising:
estimating a location of each slice of multiple slices in a video frame, by dividing a total number of packets of the video frame to the multiple slices, and determining a location of ending packet in each of the multiple slices according to a number of packets of every slice, wherein the number of packets of every slice is equal;
determining a lost packet in the video frame and a slice to which the lost packet belongs;
determining a location of a most important lost packet in the slice to which the lost packet belongs, wherein the most important lost packet is a lost packet having the largest influence on a video quality of a current slice; and
determining a video quality of the video frame according to the location of the most important lost packet in every slice.

2. The method according to claim 1, wherein determining the location of the most important lost packet in the current slice comprises:
acquiring a serial number of the lost packet in the slice to which the lost packet belongs and a reference relation between all packets in the slice; and
determining the location of the most important lost packet in the current slice according to the reference relation between all packets in the slice.

3. The method according to claim 1, wherein determining the lost packet in the video frame and the slice to which the lost packet belongs comprises:
acquiring video frame information from a video transmission source end to determine the lost packet in the video frame and the slice to which the lost packet belongs.

4. The method according to claim 1, wherein determining the video quality of the video frame comprises:
calculating, according to the location of the most important lost packet in the slice, a number of packets that are in the slice and influenced by the most important lost packet;
calculating a ratio of the number of the packets that are in the slice and influenced by the most important lost packet to the total number of packets in the video frame, to obtain a quality influence ratio of the slice; and
summating the quality influence ratio of every slice to obtain a quality influence ratio of the video frame.

5. The method according to claim 4, wherein after the quality influence ratio of every slice is summated, the method further comprises:
modifying a summation result according to an error concealment parameter, and using a modified result as the quality influence ratio of the video frame.

6. The method according to claim 1, comprising:
determining the video quality of a video sequence according to the video quality of the video frame and a number of video frames that are in the video sequence and influenced by the video frame.

7. The method according to claim 1, further comprising:
obtaining the video quality of a video sequence by performing piecewise calculation according to the video quality of the video frame and the video quality of a subsequent frame influenced by the video frame.

8. An apparatus for evaluating video quality, comprising:
an estimation unit configured to estimate a location of each slice of multiple slices in a video frame, by dividing a total number of packets of the video frame to the multiple slices, and determining a location of ending packet in each of the multiple slices according to a number of packets of every slice, wherein the number of packets of every slice is equal;
a first determination unit configured to determine a lost packet in a video frame and a slice to which the lost packet belongs;
a second determination unit configured to determine a location of a most important lost packet in the slice to which the lost packet belongs, wherein the most important lost packet is the lost packet having the largest influence on the video quality of a current slice; and
a third determination unit configured to determine a video quality of the video frame according to the location of the most important lost packet in every slice.

9. The apparatus according to claim 8, wherein
the first determination unit is configured to acquire video frame information from a video transmission source end, to determine the lost packet in the video frame, and the slice to which the lost packet belongs;
the first determination unit is configured to parse received video packets, to determine the lost packet in the video frame and the slice to which the lost packet belongs; or the first determination unit is configured to acquire a parsing result of the video packets from a parsing apparatus, and determine the lost packet in the video frame and the slice to which the lost packet belongs according to the parsing result.

10. A system for evaluating video quality, comprising:
a sending apparatus configured to generate and send a video packet; and
an evaluation apparatus configured to estimate a location of each slice of multiple slices in a video frame, by dividing a total number of packets of the video frame to the multiple slices, and determining a location of ending packet in each of the multiple slices according to a number of packets of every slice, wherein the number of packets of every slice is equal, determine a lost packet in a video frame and a slice to which the lost packet belongs, determine a location of a most important lost packet in the slice to which the lost packet belongs, wherein the most important lost packet is the lost packet having the largest influence on the video quality of a current slice, and determine a video quality of the video frame according to the location of the most important lost packet in every slice.

11. The system according to claim 10, wherein the evaluation apparatus is further configured to obtain the video quality of a video sequence by performing piecewise calculation according to the quality of the video frame and the quality of a subsequent frame influenced by the video frame.

\* \* \* \* \*